United States Patent
Hirai et al.

(10) Patent No.: US 9,695,903 B2
(45) Date of Patent: Jul. 4, 2017

(54) DAMPER FOR COMPRESSOR OF COOLING APPARATUS AND REFRIGERATOR

(75) Inventors: Tsuyoki Hirai, Osaka (JP); Akira Naito, Saitama (JP)

(73) Assignees: Panasonic Corporation, Osaka (JP); Polymatech Japan Co., Ltd., Saitama (JP)

( * ) Notice: Subject to any disclaimer, the term of this patent is extended or adjusted under 35 U.S.C. 154(b) by 450 days.

(21) Appl. No.: 14/241,528

(22) PCT Filed: Aug. 29, 2012

(86) PCT No.: PCT/JP2012/071825
§ 371 (c)(1),
(2), (4) Date: Feb. 27, 2014

(87) PCT Pub. No.: WO2013/035600
PCT Pub. Date: Mar. 14, 2013

(65) Prior Publication Data
US 2014/0202199 A1     Jul. 24, 2014

(30) Foreign Application Priority Data

Sep. 5, 2011  (JP) .................................. 2011-193009

(51) Int. Cl.
*F16F 9/10*   (2006.01)
*F16F 15/02*  (2006.01)
(Continued)

(52) U.S. Cl.
CPC ........ *F16F 15/022* (2013.01); *F04B 39/0044* (2013.01); *F16F 13/08* (2013.01); *F25D 23/006* (2013.01); *F25B 2500/13* (2013.01)

(58) Field of Classification Search
CPC ................. F16F 9/00; F16F 9/10; F16F 9/361
See application file for complete search history.

(56) References Cited

U.S. PATENT DOCUMENTS

| 4,643,386 A | 2/1987 | Chastine |
| 4,815,574 A * | 3/1989 | Taylor ................ F16F 9/361 |
| | | 188/269 |

(Continued)

FOREIGN PATENT DOCUMENTS

| CN | 1187610 A | 7/1998 |
| CN | 2871972 Y | 2/2007 |

(Continued)

OTHER PUBLICATIONS

Supplementary European Search Report for European Patent App. No. 12830201.5 (Sep. 7, 2015).

(Continued)

*Primary Examiner* — Patrick Hamo
(74) *Attorney, Agent, or Firm* — Cermak Nakajima & McGowan LLP; Tomoko Nakajima

(57) ABSTRACT

To provide a novel damper for a compressor that includes a vibration isolation system that suits the low rotation speed of a compressor of a cooling apparatus.

A plurality of support projections that support annular mounting portions of a compressor at multiple points are provided at an upper end portion of a cylindrical support. The plurality of support projections elastically support the compressor so that the compressor has a high center of gravity and allow the compressor to be laterally displaced by vibration. Moreover, a bellows portion that is elastically deformed while being in contact with the annular mounting portion that becomes laterally displaced is provided. The elastic deformation of the bellows portion buffers the lateral displacement of the compressor and stirs a viscous fluid that fills inside thereof to buffer the vibration.

15 Claims, 5 Drawing Sheets

(51) Int. Cl.
    *F04B 39/00*     (2006.01)
    *F16F 13/08*     (2006.01)
    *F25D 23/00*     (2006.01)

(56) References Cited

U.S. PATENT DOCUMENTS

| | | | |
|---|---|---|---|
| 5,913,892 A | 6/1999 | Kwon | |
| 7,444,653 B2 * | 10/2008 | Makino | G11B 17/028 |
| | | | 720/651 |
| 2007/0259141 A1 * | 11/2007 | Ohki | F16F 9/30 |
| | | | 428/35.2 |

FOREIGN PATENT DOCUMENTS

| | | |
|---|---|---|
| DE | 3507835 A1 | 10/1986 |
| DE | 9313980.2 U1 | 12/1993 |
| EP | 1852870 A1 | 11/2007 |
| JP | 61-144447 A | 7/1986 |
| JP | 10-141413 A | 5/1998 |
| JP | 10-238928 A | 9/1998 |
| JP | 2000-028221 A | 1/2000 |
| JP | 2000-266098 A | 9/2000 |
| JP | 2002-031056 A | 1/2002 |
| JP | 4740721 B2 | 5/2011 |

OTHER PUBLICATIONS

Office Action from Chinese Patent App. No. 201280043018.9 (Apr. 9, 2015).
International Search Report for PCT Patent App. No. PCT/JP2012/071825 (Dec. 4, 2012).
Office Action from Japanese Patent App. No. 2011-193009 (Jul. 3, 2015).

\* cited by examiner

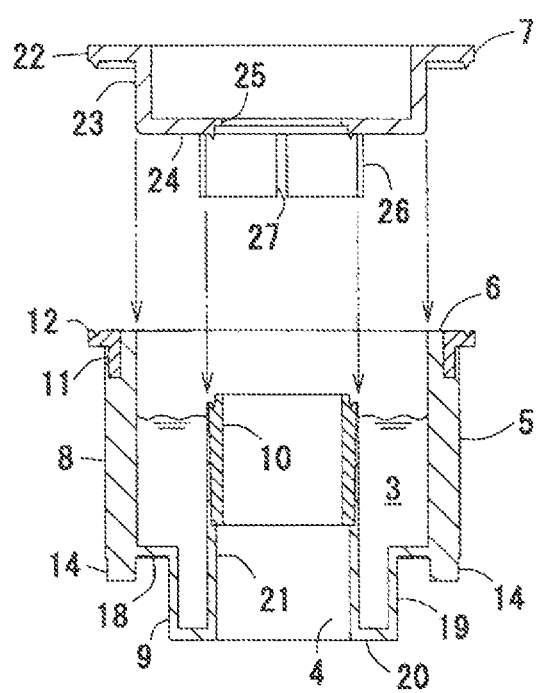

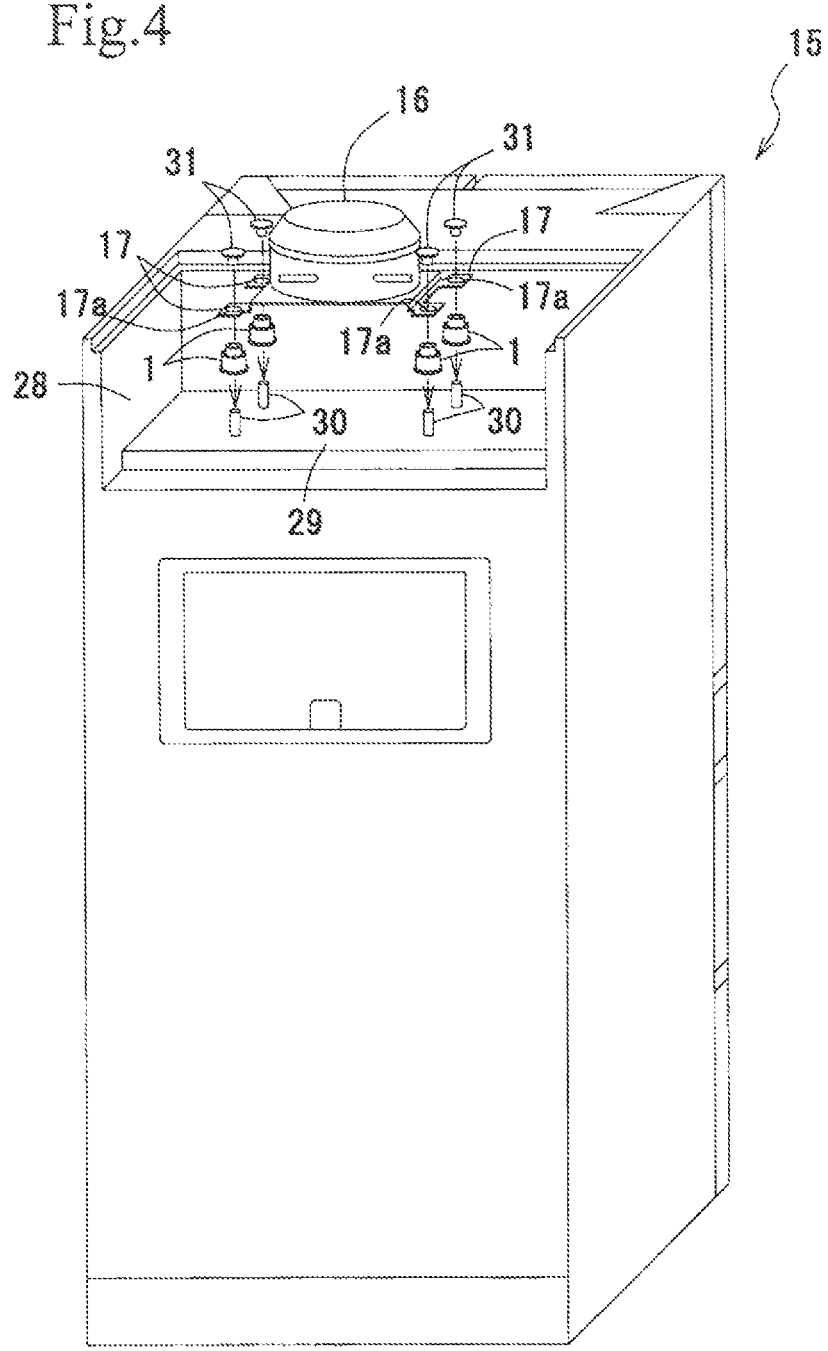

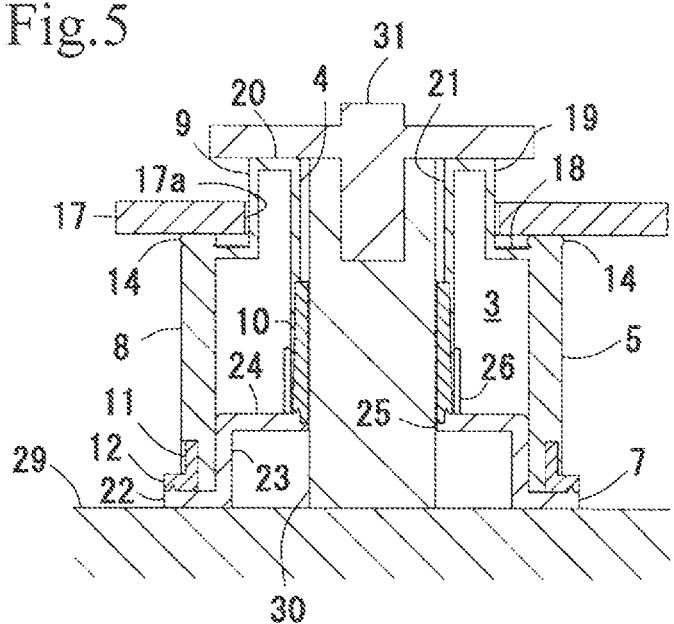
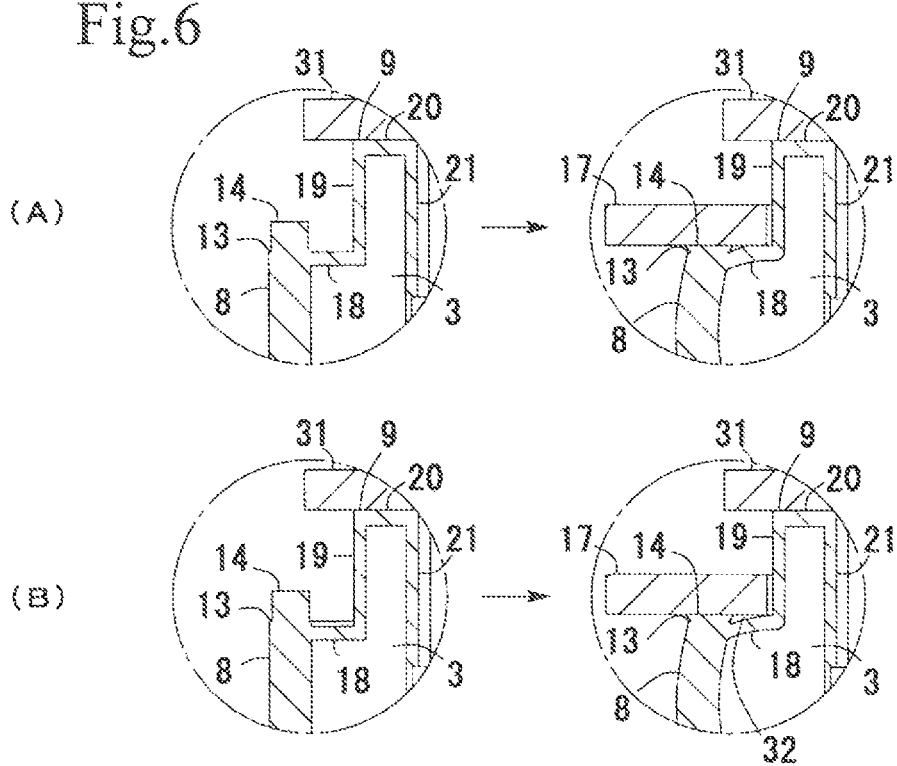

DAMPER FOR COMPRESSOR OF COOLING APPARATUS AND REFRIGERATOR

This application is a national phase entry under 35 U.S.C. §371 of PCT Patent Application No. PCT/JP2012/071825, filed on Aug. 29, 2012, which claims priority under 35 U.S.C. §119 to Japanese Patent Application No. 2011-193009, filed Sep. 5, 2011, both of which are incorporated by reference.

TECHNICAL FIELD

The present invention relates to a damper for a compressor that is used to damp vibration of a compressor of a cooling apparatus such as a refrigerator.

BACKGROUND ART

A compressor constituting a cooling cycle of a household refrigerator is a heavy component that is relatively heavy among the components of the refrigerator. Since the compressor becomes a source of vibration and noise when repeating a drive cycle such as starting, operating, and stopping, vibration control and sound proofing measures need to be carried out. As an example of the above, Patent Literature 1 discloses a technique in which a compressor is supported by vibration isolation rubbers that are a compound of rubber materials, such as isobutylene-isoprene rubber, that have been molded by a metal mold.

CITATION LIST

Patent Literature

PTL 1: Japanese Unexamined Patent Application Publication No. 10-238928

SUMMARY OF INVENTION

Technical Problem

Although it is required to further reduce the power consumption of refrigerators as a measure to save energy, the above described vibration isolation rubbers may not necessarily exert a sufficient vibration isolating performance. That is to say, it is known that further reduction in the rotation speed of a compressor is an effective measure to suppress power consumption of the compressor, however, by doing so, the vibration tends to approach the resonant frequency of the vibration transmission system. In such a case, it will be difficult to sufficiently reduce the vibration, and there is a problem in that the vibration is increased near a specific frequency, on the contrary.

As a measure to solve the above, the resonant frequency may be shifted to the low frequency side; however, in order to achieve that, the hardness of the vibration isolation rubbers themselves needs to be reduced. However, if the hardness of the vibration isolation rubbers is reduced, the bearing capacity of the vibration isolation rubbers against the compressor drops and the vibration isolation rubbers easily become deformed. Disadvantageously, abnormal noise may be generated or a refrigerant pipe connected to the compressor may become damaged due to excessive displacement of the compressor through the drive cycle.

Accordingly, in order to further facilitate low power consumption of the refrigerator, the compressor needs to be rotated at a lower speed and the dampers themselves, which are molded bodies of vibration isolation rubber, need to be radically revised.

The present invention has been made in view of the above conventional techniques. An object is to provide a novel damper for a compressor that includes a vibration isolation system that suits the low rotation speed of the compressor of a cooling apparatus, such as a refrigerator.

Solution to Problem

The damper for a compressor of a cooling apparatus of the present invention that achieves the above object has the following configuration.

(1) The present invention is a damper for a compressor of a cooling apparatus, the dumper including a hollow hermetic container and a viscous fluid with which the hermetic container is filled, the damper being installed between an annular mounting portion provided in a compressor of a cooling apparatus and a support that supports the compressor of the cooling apparatus, and the damper isolating vibration and supporting the compressor, in which the hermetic container includes a cylindrical support formed of a thick, rubbery elastic body on which the annular mounting portion is placed, the cylindrical support elastically supporting a weight of the compressor, and a bellows portion formed of a thin film-shaped rubbery elastic body that is provided inside the cylindrical support, the bellows portion being elastically deformed while being in contact with the annular mounting portion of the compressor that is laterally displaced by vibration.

The hermetic container includes the cylindrical support formed of a thick, rubbery elastic body on which the annular mounting portion is placed, in which the cylindrical support elastically supports the weight of the compressor. Accordingly, a weight of the compressor that is relatively heavy in a refrigerator can be reliably supported. Furthermore, not just supporting the weight, the vibration generated in the up-down direction during the drive cycle of the compressor can be damped.

The hermetic container includes the bellows portion formed of a thin film-shaped rubbery elastic body that is inserted into the engagement hole of the annular mounting portion and that elastically supports the lateral displacement of the compressor. Accordingly, the lateral displacement caused by the vibration generated in the drive cycle of the compressor can be buffered and reduced by the soft bellows portion having a thin film shape.

(2) In the present invention, an upper end portion of the cylindrical support includes a plurality of support projections that support the annular mounting portion at multiple points. The bearing capacity of the support projections is insufficient compared to that of the cylindrical support. When the annular mounting portions are placed on the support projections, the support projections become compressed and deformed while elastically supporting the compressor so that the compressor has a high center of gravity and allow the compressor to be laterally displaced by vibration. The compressor tends to slowly and greatly displace itself due to the low rotation speed. The present invention takes advantage of such vibration characteristics of the compressor. The compressor is elastically supported by the support projections so as to have a high center of gravity to facilitate lateral displacement. The bellows portion is in contact with the annular mounting portion, which is laterally displaced together with the compressor by vibration, and buffers the lateral displacement of the compressor by receiving the lateral displacement by elastic deformation, and the viscous fluid is stirred by the elastic deformation such that vibration is buffered.

As described above, regarding the vibration isolation mechanism of the damper for a compressor of the present invention, the compressor is supported by the cylindrical support while lateral displacement of the compressor is permitted by the support projections with insufficient bearing capacity provided at the upper end portion of the cylindrical support. Vibration damping of the lateral displacement is carried out by elastic deformation of the bellows portion and by the stirring resistance of the viscous fluid, in which the stirring is caused by the elastic deformation. Note that the lateral displacement permitted by the damper of the present invention is a lateral displacement that does not damage the refrigerant pipe that is connected to the compressor.

(3) In the present invention, the hermetic container includes a cylindrical outer periphery reinforcing wall that is embedded in a lower end portion of the cylindrical support.

The outer periphery reinforcing wall can serve as a core material and reinforce the bearing capacity of the cylindrical support that is formed of the rubbery elastic body and can reliably support the compressor, which is a heavy load, without the cylindrical support being deformed or buckled.

(4) In the present invention, the hermetic container includes a cylindrical inner periphery reinforcing wall that supports an inner peripheral surface of the cylindrical support.

The inner periphery reinforcing wall supports the inner peripheral surface of the cylindrical support formed of the rubbery elastic body; accordingly, the bearing capacity of the cylindrical support can be reinforced and the cylindrical support can reliably support the compressor, which is a heavy load, without the cylindrical support being deformed or buckled.

(5) In the present invention, an outer periphery reinforcing wall and the inner periphery reinforcing wall are concentrically arranged so as to overlap each other. The concentric and overlapping arrangement allows the bearing capacity of the cylindrical support formed of the rubbery elastic body to be further reinforced from the inside and the outside.

(6) In the present invention, the bellows portion includes a connection portion that is connected to the inner peripheral surface of the cylindrical support at a position below the upper end portion of the cylindrical support. There are cases in which the annular mounting portion of the vibrating compressor squashes the support projection. In such a case, when the bellows portion is structured so as to be connected to the upper end portion of the cylindrical support, the bottom surface of the annular mounting portion and the connection portion of the bellows portion become substantially flush with each other and greatly come into contact with each other. As a result, the bellows portion is restricted and the range of motion becomes smaller, and, disadvantageously, the damping performance may be hindered.

However, in the present invention, since the bellows portion is connected at a position below the upper end portion of the cylindrical support, the gap formed between the bottom surface of the annular mounting portion and the connection portion of the bellows portion can be maintained more easily. As a result, the bellows portion becomes less likely to be restricted by coming into contact with the annular mounting portion, and a desired damping performance can be exerted in a stable manner.

(7) In the present invention, the hermetic container has a cylindrical shape and includes a cylindrical bearing, into which a securing pin provided in a support of the compressor is inserted, that is formed of a hard material in an inner peripheral portion of the hermetic container. Since the bearing, which is formed of a hard material, for inserting the securing pin is provided in the hermetic container, the damper can be reliably mounted onto the support.

(8) In the present invention, an outer periphery of the bearing includes a cylindrical bearing reinforcing wall. For example, when the refrigerator is moved and tilted and an offset load is applied to the compressor, load and vibration are applied to the securing pins, which are vertically standing upright, in the direction intersecting the securing pins, and, disadvantageously, damage may be caused due to large stress. Even in such a case, in the present invention, reinforcement can be carried out with the bearing reinforcing wall so that the bearing, into which the securing pin is inserted, does not become damaged.

(9) In the present invention, the bearing reinforcing wall includes a slit for removing air.

Accordingly, when the hermetic container is formed, air can be purged through the slit of the bearing reinforcing wall and no air will remain in the viscous fluid, thus, a desired damping performance can be exerted.

(10) In the present invention, the hermetic container includes a container body having an opening end and a lid that closes the opening end, in which the container body includes the cylindrical support that forms the opening end and the bellows portion.

According to such a hermetic container, the damper for a compressor can be constituted by the container body and the lid.

(11) In the present invention, the container body is provided with the outer periphery reinforcing wall that includes a fixing flange and the lid is provided with the inner periphery reinforcing wall that includes a fixing flange, in which the container body is sealed by the lid by fixing the fixing flanges together.

Accordingly, the outer periphery reinforcing wall and the inner periphery reinforcing wall not only can serve to reinforce but can serve to reliably seal the container body and the lid together by fixing the fixing flanges together, thus, it is possible to dispense of using exclusive parts for fixing and prevent the number of parts to increase.

(12) The present invention is, further, a refrigerator that includes a machine chamber that houses the compressor, in which the damper for a compressor is arranged inside the machine chamber. By applying the vibration isolation system, which suits the low rotation speed of the compressor, to the refrigerator, energy saving can be achieved while reliability and noise reduction are improved.

(13) The present invention is, further, a refrigerator that is provided with the machine chamber in an upper portion of the main body of the refrigerator. In the case where the compressor is arranged in the upper portion, If the bearing capacity and the damping force of the vibration isolation rubber are insufficient under a vibration mode in which the lower portion on the floor surface is a fixed end and the upper portion is a free end, disadvantageously, the compressor at the upper portion may be even more displaced; however, by applying the damper for a compressor, vibration can be adequately absorbed and reliability can be increased. Furthermore, by arranging the compressor in the upper portion, noise of the compressor may reach a user more easily; however, by applying the damper for a compressor, noise related to vibration can be adequately absorbed and reduction of noise can be improved.

(14) The present invention is, further, a refrigerator that employs an inverter compressor that is capable of varying its rotation speed. The vibration, which is generated from a wide variation of rotation speeds (frequencies) of the inverter compressor when the capacity of the inverter compressor is controlled by varying the rotation speed thereof, can be adequately absorbed, and improvement of cooling capacity and energy saving can be achieved while improving reliability and noise reduction.

Advantageous Effects of Invention

The damper for a compressor of a cooling apparatus according to the present invention employs a vibration isolation mechanism that supports the compressor with a cylindrical support and that permits the compressor to be laterally displaced by the support projections, which are provided at the upper end portion of the cylindrical support and have insufficient bearing capacity. The vibration isolation mechanism carries out damping of the lateral displacement with the elastic deformation of the bellows portion and with the stirring resistance of the viscous fluid, in which the stirring is caused by the elastic deformation; accordingly, the damper for a compressor can carry out vibration damping that is suitable for the vibration characteristic of the compressor that is devised to rotate in a low rotation speed for low power consumption. The above cannot be carried out with conventional vibration isolation rubbers. Accordingly, a contribution to the energy saving effect of the refrigerator can be made by reduction in power consumption of the compressor.

BRIEF DESCRIPTION OF DRAWINGS

FIG. 3 is an exploded view of the damper for a compressor of FIG. 1.

FIG. 4 is a back side perspective view of a refrigerator provided with the damper for a compressor of FIG. 1.

FIG. 5 is a cross-sectional view illustrating the damper for a compressor of FIG. 1 in an installed state.

FIG. 6 are diagrams for illustrating operations of the dampers for a compressor, in which sub-FIG. 6(A) is a diagram illustrating an operation of a comparative example and sub-FIG. 6(B) is a diagram illustrating an operation of the damper for a compressor of FIG. 1.

DESCRIPTION OF EMBODIMENTS

A damper for a compressor used in a cooling apparatus and a refrigerator according to an exemplary embodiment of the present invention will be described below.

Figure 1:
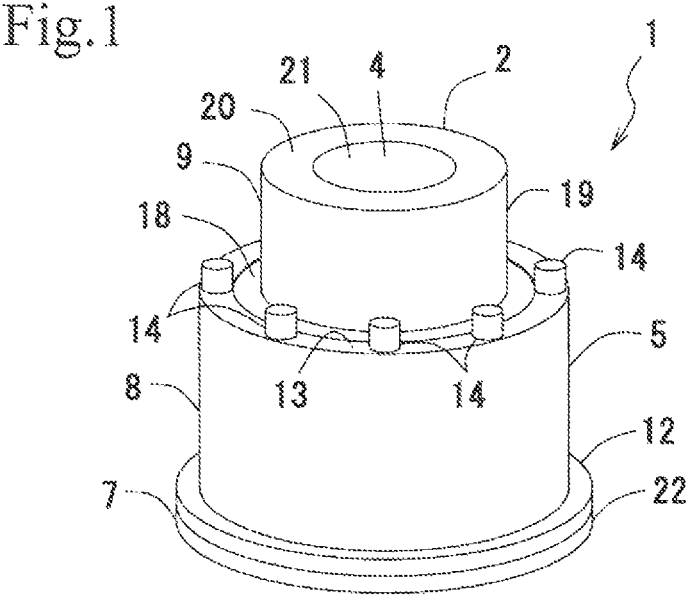
FIG. 1 is an external perspective view of a damper for a compressor according to a first exemplary embodiment of the present invention.
Figure 2:
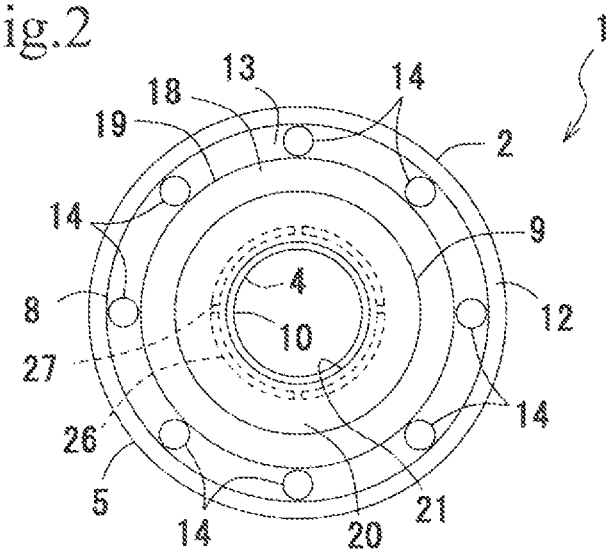
FIG. 2 is a plan view of the damper for a compressor of FIG. 1.

Configuration of Damper 1 for Compressor [FIGS. 1 to 3]

A damper 1 for a compressor of a refrigerator is a viscous-fluid-filled damper including a hermetic container 2, whose appearance is shown in FIG. 1, that is filled with a viscous fluid 3 such as silicone oil, as shown in FIG. 3. The hermetic container 2 has a cylindrical shape and a bearing hole 4 is formed along the central axis thereof. In the hermetic container 2, an opening end 6 of a container body 5 is closed with a lid 7.

The container body 5 includes a cylindrical support 8, a bellows portion 9, and a bearing 10.

The cylindrical support 8 constitutes an outer peripheral wall of a major diameter of the container body 5 and is formed of a thick and rubbery elastic body. In other words, the cylindrical support 8 is formed with a thickness that does not allow the cylindrical support 8 to buckle under the weight of the compressor of the refrigerator and that can support the weight of the compressor of the refrigerator without excessive deformation of the cylindrical support 8.

A cylindrical, outer periphery reinforcing wall 11 is integrally embedded in a lower end portion (opening end 6) of the cylindrical support 8. The outer periphery reinforcing wall 11 serves as a core material of the opening end 6 and reinforces the bearing capacity of the cylindrical support 8; accordingly, the outer periphery reinforcing wall 11 allows the cylindrical support 8 to reliably support the compressor, which is a heavy load, without the cylindrical support 8 being excessively deformed or buckled. The outer periphery reinforcing wall 11 is, therefore, formed of rigid resin. A brim-shaped fixing flange 12 that protrudes laterally is formed in the outer periphery reinforcing wall 11.

A plurality of support projections 14 are arranged in a projecting manner at an upper end portion 13 of the cylindrical support 8 so as to be spaced apart from each other in the circumferential direction of the upper end portion 13 of the cylindrical support 8. As illustrated in FIG. 2, in the present exemplary embodiment, eight support projections 14 are formed at equiangular positions at 45° intervals with respect to the center of the cylindrical support 8. The support projections 14 are each formed in a columnar shape having a diameter that is slightly smaller than the wall thickness of the cylindrical support 8. Annular mounting portions 17 of a compressor 16 of a refrigerator 15 illustrated in FIG. 4 are mounted on the support projections 14.

The bellows portion 9 is formed in a soft thin film shape with a rubbery elastic body, and an annular connection portion 18, a cylindrical lateral support portion 19, an annular upper surface portion 20, and a cylindrical inner peripheral portion 21 are formed from the outer periphery towards the inner periphery.

The annular connection portion 18 is formed so as to be connected to the inner peripheral surface of the cylindrical support 8. The position where the annular connection portion 18 is connected is the lower side of the upper end portion 13 of the cylindrical support 8 (described below).

The lateral support portion 19 bends upwards from the inner peripheral end of the connection portion 18 and projects above the support projections 14. The height of the projection is much larger than a plate thickness of the annular mounting portions 17 of the compressor 16 that is placed on the support projections 14.

The top surface portion 20 is an annular flat surface that is bent at a right angle from the upper end position of the lateral support portion 19.

The inner peripheral portion 21 has a cylindrical shape that is formed from the inner peripheral end of the top surface portion 20 and that is concentric with the lateral support portion 19. A bottom half of the inner peripheral portion 21 is integrally formed with the bearing 10 so as to surround the outer peripheral surface of the bearing 10. The bearing hole 4 includes the inner peripheral surface of the inner peripheral portion 21 and the inner peripheral surface of the bearing 10.

The bearing 10 is formed in a cylindrical shape. A securing pin 30 of the refrigerator 15 described below is inserted into the bearing 10 without any play and the bearing 10 is firmly secured to the securing pin 30.

The lid 7 is a molded body made of rigid resin and includes, from the outer periphery to the inner periphery thereof, an annular fixing flange 22, a cylindrical inner periphery reinforcing wall 23, and an annular lid portion 24. The fixing flange 22 and the fixing flange 12 of the container body 5 are fixed together such that the container body 5 is sealed in a liquid-tight manner on the outer peripheral side of the hermetic container 2. Regarding the fixing method, ultrasonic fusion is carried out in the present exemplary embodiment.

When fitting the inner periphery reinforcing wall 23 and the container body 5 together, the inner periphery reinforcing wall 23 is inserted into the inner peripheral surface of the cylindrical support 8. The inner periphery reinforcing wall 23 is in contact with and supports the inner peripheral surface of the cylindrical support 8 from the inside. Accordingly, the bearing capacity of the cylindrical support 8 can be reinforced from the inside and the compressor 16, which is a heavy load, can be reliably supported without the cylindrical support being excessively deformed or buckled. Furthermore, when the container body 5 and the lid 7 are fitted together, the inner periphery reinforcing wall 23 and the outer periphery reinforcing wall 11 are concentrically arranged so as to overlap each other. Accordingly, the bearing capacity of the cylindrical support 8 is reinforced from the inside and the outside of the cylindrical support 8.

A bearing insertion hole 25 is formed in the middle of the lid portion 24. A cylindrical bearing reinforcing wall 26 is formed at the hole edge of the bearing insertion hole 25. Slits 27 for removing air are formed in four places in the bearing reinforcing wall 26 (described later). The lid portion 24 and the bearing 10 of the container body 8 are fixed together such that the container body 5 is sealed in a liquid-tight manner on the inner peripheral side of the hermetic container 2. Regarding the fixing method, ultrasonic fusion is carried out in the present exemplary embodiment.

Material of Each Part of Damper 1 for Compressor

The cylindrical support 8 and the bellows portion 9 of the container body 5 are formed of a rubbery elastic body. As regards the rubbery elastic body, synthetic rubber, such as isobutylene-isoprene rubber, acrylic rubber, ethylene-propylene rubber, or silicone rubber may be used. Among the above, the present exemplary embodiment uses isobutylene-isoprene rubber that is excellent in terms of vibration damping, anti-gas permeability, wear resistance, and the like.

The bearing 10, the outer periphery reinforcing wall 11, the fixing flange 12 of the container body 5, and the lid 7 are formed of rigid resin. Specifically, the above components may be formed of thermoplastic resin, such as polypropylene resin, acrylonitrile-butadiene-styrene resin, polyamide resin, or the like or thermosetting resin, such as phenol resin, melamine resin, or the like.

Moreover, as described above, the container body 5 is molded into a single integrated part by insert molding in the present exemplary embodiment. Furthermore, a bonded surface at which the fixing flange 12 of the container body 5 and the fixing flange 22 of the lid 7 are strongly bonded by ultrasonic fusion can be formed on the outer peripheral side of the hermetic container 2, and a bonded surface at which the bearing 10 of the container body 5 and the hole edge of the bearing insertion hole 25 of the lid portion 24 of the lid 7 are strongly bonded by ultrasonic fusion can be formed on the inner peripheral side of the hermetic container 2.

As regards the viscous fluid 3, a viscous fluid including a liquid and solid particles, which are added to the liquid and do not react or dissolve in the liquid, is used. Depending on the required characteristics, such as heat resistance, reliability, vibration isolation characteristic, and damping characteristic, a viscous fluid including silicone oil and solid particles, which are dispersed in the silicone oil and do not react or dissolve in the silicone oil, may be used. As regards the silicone oil, dimethylsilicone oil, methylphenyl silicone oil, or the like may be used. As regards the solid particles that do not react or dissolve, for example, silicone resin powder, polymethylsilsesquioxane powder, wet silica sand, dry silica sand, or surface treated products of these may be used. The above may be used alone or a few of them may be used in combination.

Method of Manufacturing Damper 1 for Compressor [FIG. 3]

An exemplary method of manufacturing the damper 1 for a compressor will be given with reference to FIG. 3.

First, a molded body of the container body 5, which is an integrated body formed of different materials, is fabricated by insert molding. Furthermore, a molded body of the lid 7 is fabricated by molding rigid resin.

Next, the opening end 6 is sealed with the lid 7 after the container body 5 is filled with the viscous fluid 3. At this time, the inner periphery reinforcing wall 23 of the lid 7 is inserted into the inner periphery of the cylindrical support 8 of the container body 5 such that the bearing reinforcing wall 26 of the lid 7 covers and is fitted to the outside of the inner peripheral portion 21 of the bellows portion 9 that covers the outer periphery of the bearing 10. Thereupon, the bearing reinforcing wall 26 of the lid 7 moves into the viscous fluid 3. Accordingly, the liquid surface rises and the remaining air inside the hermetic container 2 can be discharged to the outside through the slits 27 for removing air. The residual air inside the hermetic container 2 is removed in the above manner so that the damping performance does not drop.

Last of all, an ultrasonic horn, which does not appear in the figures, is used to form a bonded surface on the outer peripheral side of the hermetic container 2 by bonding the fixing flange 12 of the container body 5 and the fixing flange 22 of the lid 7 by ultrasonic fusion and to form a bonded surface on the inner peripheral side of the hermetic container 2 by bonding the bearing 10 of the container body 5 and the hole edge of the bearing insertion hole 25 of the lid portion 24 of the lid 7 by ultrasonic fusion. Accordingly, the container body 5 is sealed by the lid 7 in a liquid tight-manner and the damper 1 for a compressor can be obtained.

Application Mode of Damper 1 for Compressor and Exemplary Embodiment of Refrigerator provided with Damper 1 for Compressor [FIGS. 4 and 5]

FIG. 4 is a perspective view schematically illustrating a backside of the refrigerator 15 provided with the damper 1 for a compressor. In the refrigerator 15, various components including the compressor 16 that constitute a cooling cycle and a refrigerating cycle are arranged at the upper back portion of the refrigerator 15 in order to increase the inner capacity of the lower portion of the refrigerator 15. A machine chamber 28 is provided at the upper back portion of the refrigerator 15, and four securing pins 30 serving as "supports" are protrudingly provided on an installation surface 29 so as to protrude therefrom. First, the securing pins 30 are inserted into the bearing holes 4 to install the damper 1 for a compressor.

Next, engagement holes 17a of the annular mounting portions 17 of the compressor 16 are each placed on top of the corresponding outer periphery of the bellows portion 9 of the damper 1 for a compressor to place the annular mounting portions 17 on the support projections 14 of the damper 1 for a compressor.

Finally, a washer screw 31 serving as a fastener is fastened to each securing pin 30; accordingly, the compressor 16 can be supported and vibration thereof can be isolated with the dampers 1 for a compressor (FIG. 5). Note that in the above state, the support projections 14 of the damper 1 for a compressor elastically support the compressor 16 in a compressed state, which is a state in which the support projections 14 of the damper 1 for a compressor are crushed by the weight of the compressor 16.

Furthermore, the compressor 16 according to the present exemplary embodiment employs an inverter compressor that can vary its rotation speed. Specifically, a microcomputer controls the rotation speed of a motor of the compressor 16 in a stepwise manner at about 20 to 70 [r/s] in accordance with the difference between the temperature inside each storeroom inside the refrigerator 15 and the set temperature, and the ambient temperature.

Note that while a description is given in which the machine chamber 28 housing the compressor 16 is provided in the upper back portion of the main body of the refrigerator 15, the position of the machine chamber is not limited to the above. The invention may be applied to a refrigerator that is provided with a machine chamber at a lower portion or the like of the main body.

Figure 7:
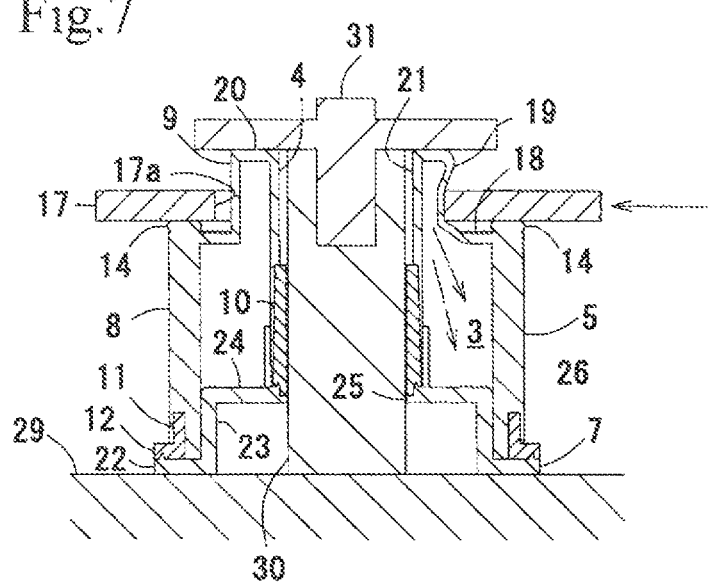
FIG. 7 is a diagram illustrating an operation of the damper for a compressor of FIG. 1.

Advantageous Effects of Damper 1 for Compressor [FIGS. 5 to 7]

Additional to the advantageous effects that has been already described, the damper 1 for a compressor of the present exemplary embodiment can exert the following advantageous effects.

The cylindrical support 8 of the hermetic container 2 of the damper 1 for a compressor is formed of a thick, rubbery elastic body (FIG. 5). Accordingly, the weight of the compressor 16 that is relatively heavy among the components in the refrigerator 15 can be reliably supported. Furthermore, not just supporting the weight, the vibration generated in the up-down direction during the drive cycle of the compressor 16 can be damped.

A lateral support portion 19, which absorbs the lateral displacement of the compressor 16 while abutting against the engagement hole 17a of the annular mounting portions 17 and elastically deforming itself, is formed in the bellows portion 9 of the hermetic container 2. Accordingly, the lateral displacement caused by the vibration generated in the drive cycle of the compressor 16 is buffered by elastic deformation of the soft lateral support portion 19 having a thin film shape, and, further, the lateral displacement can be buffered through stirring resistance of the viscous fluid 3, in which the stirring is caused by elastic deformation (FIGS. 5 and 7).

The upper end portion 13 of the cylindrical support 8 includes the plurality of support projections 14 that support the annular mounting portions 17 at multiple points. The bearing capacity of the support projections 14 is poor compared to that of the cylindrical support 8. When the annular mounting portions 17 are placed on the support projections 14, the support projections 14 become partially in contact in a compressed and deformed state with the annular mounting portions 17 at multiple points rather than being in plane contact thereto. The support projections 14 elastically support the compressor 16 so that the compressor 16 has a high center of gravity and, further, allow the compressor 16 to be laterally displaced by vibration.

In other words, the compressor 16 tends to slowly and greatly displace itself due to the low rotation speed. Now, the weight of the compressor 16 is supported by the thick cylindrical support 8, and the support projections 14 that have insufficient bearing capacity are made to elastically support the compressor 16 so that the compressor 16 has a high center of gravity; accordingly, an unstable state facilitating lateral displacement is intentionally created (FIG. 5). Furthermore, the annular mounting portions 17 that are laterally displaced by the vibration are in contact with the lateral support portions 19 of the bellows portions 9, and the lateral support portions 19 of the bellows portions 9 are elastically deformed (FIG. 7).

The elastic deformation buffers the lateral displacement of the compressor 16 and stirs the viscous fluid 3; accordingly, vibration can be buffered.

As described above, the damper 1 for a compressor employs a vibration isolation mechanism that permits the compressor 16 to be laterally displaced by the support projections 14, which is provided at the upper end portion of the cylindrical support 8, and that carries out damping of the lateral displacement with the elastic deformation of the bellows portion 9 and with the stirring resistance of the viscous fluid 3, in which the stirring is caused by the elastic deformation; accordingly, the damper 1 for a compressor can carry out vibration damping that is suitable for the vibration characteristic of the compressor 16 that is devised to rotate in a low rotation speed for low power consumption, which cannot be carried out with conventional vibration isolation rubbers. Accordingly, contribution can be made to the energy saving effect of the refrigerator 15 with the reduction in energy consumption of the compressor 16.

The support projections 14, each having an insufficient bearing capacity by itself, are elastically deformed in a compressed state with the weight of the compressor 16 placed thereon and, further, with the vibrating annular mounting portions 17 of the compressor 16. At this time, for example, as illustrated in FIG. 6(A), when the connection portion 18 of the bellows portion 9 is structured so as to be connected to the upper end portion 13 of the cylindrical support 8, the bottom surfaces of the annular mounting portions 17 and the connection portion 18 become substantially flush with each other and greatly come into contact with each other. As a result, the movement of the bellows portion 9 is restricted and the range of motion of the bellows portion 9 becomes smaller, and, thus, the damping performance is hindered.

However, in the present exemplary embodiment, as illustrated in FIG. 6(B), the connection portion 18 is structured so as to be connected at a position that is below and apart from the upper end portion 13 of the cylindrical support 8. Accordingly, even if the support projections 14 are compressed and deformed, the bottom surface of the annular mounting portion 17 and the connection portion 18 do not become substantially flush with each other and a gap 32 formed therebetween is maintained. Accordingly, the bellows portion 9 is not intensely restricted by being in contact with the annular mounting portions 17, and thus, a desired damping performance can be exerted.

For example, when the refrigerator 15 is moved and tilted and an offset load is applied to the compressor 16, a large load and vibration are applied to the securing pins 28, which are vertically standing upright, in the direction intersecting the securing pins, and the lower end portion of the bearing 10, in particular, the bonded surface that has been bonded with the lid portion 24 by ultrasonic fusion may be disadvantageously damaged due to large stress.

However, in the present exemplary embodiment, the bearing reinforcing wall 26 of the lid 7 reinforces the bearing 10 from the outside; accordingly, damage to the bonded surface, which is bonded by ultrasonic fusion, in the inner peripheral of the hermetic container 2 due to concentration of stress can be prevented.

The protection of the bonded surface bonded by ultrasonic fusion is carried out to the outer peripheral of the hermetic container 2 as well.

In other words, in order to avert damage of the bonded surface between the fixing flange 12 and the fixing flange 22, which are bonded by ultrasonic fusion, the rigidity of the outer periphery reinforcing wall 11 needs to be increased. Accordingly, in the present exemplary embodiment, the inner periphery reinforcing wall 23 is provided in the lid 7 so as to be arranged in a concentric and overlapping manner with respect to the outer periphery reinforcing wall 11.

As described above, the damper 1 for a compressor of the present exemplary embodiment reinforces the bonded surface, which is bonded by ultrasonic fusion, on the inner peripheral side of the hermetic container 2 and on the outer peripheral side thereof; accordingly, leaking of the viscous fluid 3 from the hermetic container 2 is reliably prevented. Furthermore, in the present exemplary embodiment, the upper back portion of the refrigerator 15 is provided with the machine chamber 28, the four securing pins 30 are protrudingly provided on the installation surface 29 of the machine chamber 28 so as to protrude therefrom, the securing pins 30 are inserted into the bearing holes 4 to install the damper 1 for a compressor, and each of the engagement holes 17a of the annular mounting portions 17 of the compressor 16 is placed on top of the corresponding outer periphery of the bellows portion 9 of the damper 1 for a compressor to place the annular mounting portions 17 on the support projections 14 of the damper 1 for a compressor; accordingly, a vibration isolation system that suits the low rotation speed of the compressor 16 can be applied to the refrigerator 15, and therefore, a refrigerator that can achieve low energy consumption while improving reliability and noise reduction can be provided.

Furthermore, in a case in which the compressor 16 is arranged in the upper portion, if the bearing capacity and the damping force of the vibration isolation rubber are insufficient when under a vibration mode in which the lower portion on the floor surface is a fixed end and the upper portion is a free end, disadvantageously, the compressor 16 at the upper portion may be even more displaced; however, by applying the dampers 1 for a compressor of the present exemplary embodiment, vibration can be adequately absorbed and reliability can be increased. Furthermore, by arranging the compressor 16 in the upper portion, the noise of the compressor 16 will reach a user more easily; however, by applying the dampers 1 for a compressor, noise related to vibration can be adequately absorbed and reduction of noise can be improved.

Furthermore, the refrigerator of the present exemplary embodiment employs an inverter compressor that can vary its rotation speed. The vibration, which is generated from a wide variation of rotation speeds (frequencies) of the inverter compressor when the capacity of the inverter compressor is controlled by varying the rotation speed thereof, can be adequately absorbed, and improvement of cooling capacity and energy saving can be achieved while improving reliability and noise reduction.

Modification of Exemplary Embodiment

In the exemplary embodiment described above, an example having eight support projections 14 is illustrated; however, the arrangement is not limited to the above. In other words, the support projection 14 may be any that can support the compressor 16 so that the compressor has a high center of gravity and that can facilitate the displacement of the compressor 16 towards its lateral side.

In the exemplary embodiment described above, isobutylene-isoprene rubber is used as the rubbery elastic body; however, thermoplastic elastomer may be used alternatively. In such a case, molding may be carried out by two color molding as an alternative of the insert molding.

In the exemplary embodiment described above, the annular mounting portion 17 is illustrated as an endless and annular component; however, the annular mounting portion 17 may be an open-ended annular component.

Furthermore, in the present exemplary embodiment, a description is given in which the machine chamber 28 housing the compressor 16 is provided in the upper back portion of the main body of the refrigerator 15; however, the position of the machine chamber 28 is not limited to the above and the present invention may be applied to a refrigerator provided with the machine chamber 28 in the lower portion or the like of the main body.

Furthermore, in the present exemplary embodiment, the plurality of dampers 1 for a compressor applied to the refrigerator have been described as having the same specification; however, in accordance with the drive method and the position of the center of gravity of the compressor 16, dampers 1 for a compressor that have different stiffness in their elastic body or that have different viscosity of the viscous fluid 3 may be used in combination.

INDUSTRIAL APPLICABILITY

As described above, the damper for a compressor according to the present invention is capable of carrying out vibration damping that suits the vibration characteristic of the compressor devised to rotate at low rotation speed; accordingly, the damper for a compressor according to the present invention can be applied to any application, such as a cooling apparatus, a refrigeration apparatus, and the like, that is provided with a compressor.

REFERENCE SIGNS LIST 1 damper for a compressor of a refrigerator
2 hermetic container
3 viscous fluid
4 bearing hole
5 container body
6 opening end
7 lid
8 cylindrical support
9 bellows portion
10 bearing
11 outer periphery reinforcing wall
12 fixing flange
13 upper end portion
14 support projection
15 refrigerator
16 compressor
17 annular mounting portions
17a engagement hole
18 connection portion
19 lateral support
20 upper surface portion
21 inner peripheral portion
22 fixing flange 23 inner periphery reinforcing wall
24 lid portion
25 bearing insertion hole
26 bearing reinforcing wall
27 slit
28 machine chamber
29 installation surface (support)
30 securing pin
31 washer screw
32 gap

The invention claimed is:

1. A damping system for a compressor of a cooling apparatus, comprising:
   a damper;
   a hollow hermetic container; and
   a viscous fluid with which the hermetic container is filled, the damper being installed between an annular mounting portion provided in the compressor of the cooling apparatus and a support that supports the compressor of the cooling apparatus, and the damper isolating vibration and supporting the compressor,
   wherein the hermetic container includes
      a cylindrical support formed of a thick elastic body on which the annular mounting portion is placed, the cylindrical support elastically supporting a weight of the compressor, and including, at an upper end portion thereof, a plurality of support projections that support the annular mounting portion at multiple points, and
      a bellows portion formed of a thin film-shaped elastic body that is provided inside the cylindrical support, the bellows portion being elastically deformed while being in contact with the annular mounting portion of the compressor that is laterally displaced by vibration.

2. The damping system for a compressor of a cooling apparatus according to claim 1, wherein the hermetic container includes a cylindrical outer periphery reinforcing wall that is embedded in a lower end portion of the cylindrical support.

3. The damping system for a compressor of a cooling apparatus according to claim 2, wherein the hermetic container includes a cylindrical inner periphery reinforcing wall that supports an inner peripheral surface of the cylindrical support.

4. The damping system for a compressor of a cooling apparatus according to claim 3, wherein the outer periphery reinforcing wall and the inner periphery reinforcing wall are concentrically arranged so as to overlap each other.

5. The damping system for a compressor of a cooling apparatus according to claim 1, wherein the bellows portion includes a connection portion that is connected to the inner peripheral surface of the cylindrical support at a position below the upper end portion of the cylindrical support.

6. The damping system for a compressor of a cooling apparatus according to claim 1, wherein the hermetic container has a cylindrical shape and includes a cylindrical bearing, into which a securing pin provided in a support of the compressor is inserted, that is formed of a hard material in an inner peripheral portion of the hermetic container.

7. The damping system for a compressor of a cooling apparatus according to claim 6, wherein an outer periphery of the bearing includes a cylindrical bearing reinforcing wall.

8. The damping system for a compressor of a cooling apparatus according to claim 7, wherein the bearing reinforcing wall includes a slit for removing air.

9. The damping system for a compressor of a cooling apparatus according to claim 1,
   wherein the hermetic container includes a container body having an opening end and a lid that closes the opening end, and
   wherein the container body includes the cylindrical support that forms the opening end and the bellows portion.

10. A refrigerator comprising a machine chamber that houses a compressor,
    wherein the damping system for a compressor of a cooling apparatus according to claim 1 is arranged in the machine chamber.

11. The refrigerator according to claim 10, wherein the machine chamber is provided in an upper portion of a body of the refrigerator.

12. The refrigerator according to claim 10, wherein the compressor is an inverter compressor that is capable of varying a rotation speed.

13. The damping system for a compressor of a cooling apparatus according to claim 3,
    wherein the hermetic container includes a container body having an opening end and a lid that closes the opening end, and
    wherein the container body includes the cylindrical support that forms the opening end and the bellows portion.

14. The damping system for a compressor of a cooling apparatus according to claim 13,
    wherein the container body is provided with the outer periphery reinforcing wall that includes a fixing flange,
    wherein the lid is provided with the inner periphery reinforcing wall that includes a fixing flange, and
    wherein the container body is sealed by the lid by fixing the fixing flanges together.

15. The damping system for a compressor of a cooling apparatus according to claim 1, wherein the hermetic container includes a cylindrical inner periphery reinforcing wall that supports an inner peripheral surface of the cylindrical support.

* * * * *